United States Patent

[11] 3,538,953

| [72] | Inventor | Marion J. Berger |
| | | Sepulveda, California |
| [21] | Appl. No. | 696,615 |
| [22] | Filed | Jan. 9, 1968 |
| [45] | Patented | Nov. 10, 1970 |
| [73] | Assignee | Schurz Controls Corporation |
| | | Los Angeles, California |
| | | a corporation of California |

[54] ROLLER SEAL VALVE
2 Claims, 12 Drawing Figs.

[52] U.S. Cl. .................................................... 137/625.46,
137/625.44; 251/318
[51] Int. Cl. ........................................................F16k 11/08,
F16k 13/00
[50] Field of Search........................................... 251/Ball V.
Supp Op., Curtain type, 298, 318, 319;
137/625.46, 625.48, 625.4, 625.44

[56] References Cited
UNITED STATES PATENTS

| 1,171,189 | 2/1916 | Grandi | 251/298 |
| 2,989,076 | 6/1961 | Rohmann | 137/625.2 |
| 3,119,413 | 1/1964 | Waldo | 137/625.46X |
| 3,238,965 | 3/1966 | Masheder | 251/333X |
| 870,377 | 11/1907 | Marett | 137/607X |
| 3,131,862 | 5/1964 | Deydier | 137/625.4X |

FOREIGN PATENTS

| 314,068 | 6/1918 | Germany | 137/625.46 |
| 1,092,090 | 11/1967 | Great Britain | 137/625.46 |
| 1,016,083 | 9/1957 | Germany | 251/192 |

Primary Examiner—M. Cary Nelson
Assistant Examiner—Michael O. Sturm
Attorney—Angus & Mon ABSTRACT: This invention comprises a valve for the handling of fluids which utilizes a housing containing fluid passages, a valve-actuating member, and a sealing member actuated by said valve-actuating member to seal off or open selectively at least one of the ports. The sealing member is in the form of a roller which may optionally have an elastomeric peripheral surface. The roller eliminates sliding friction with the valve housing. Various of the embodiments include a valve-actuating member mounted for linear movement in the housing, and others for rotary movement.

Patented Nov. 10, 1970
3,538,953
Sheet 1 of 2
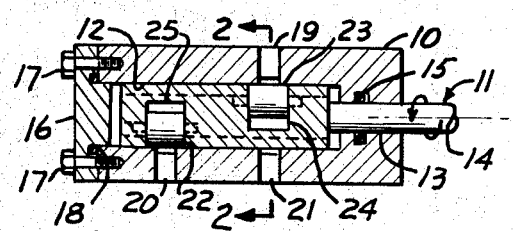
FIG. 1
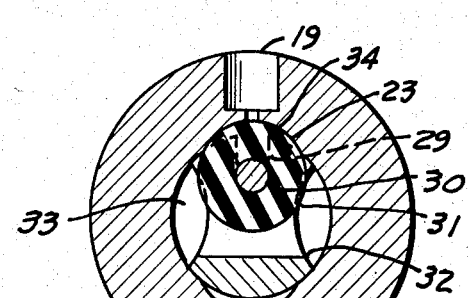
FIG. 2
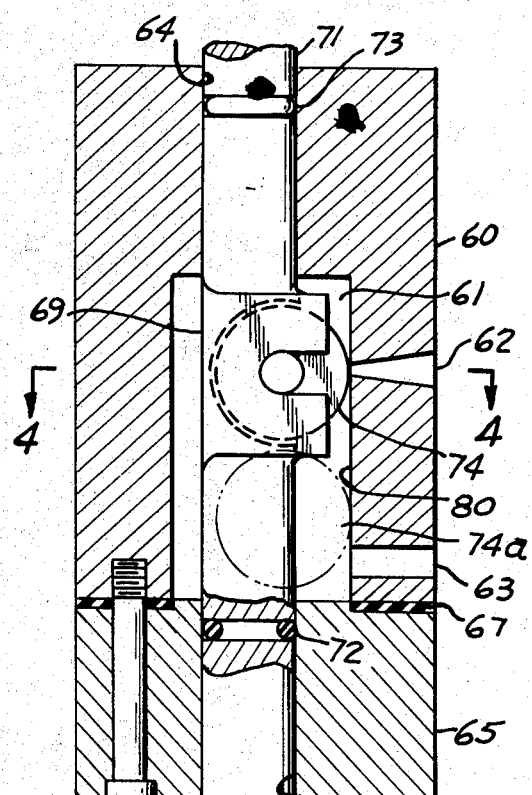
FIG. 3
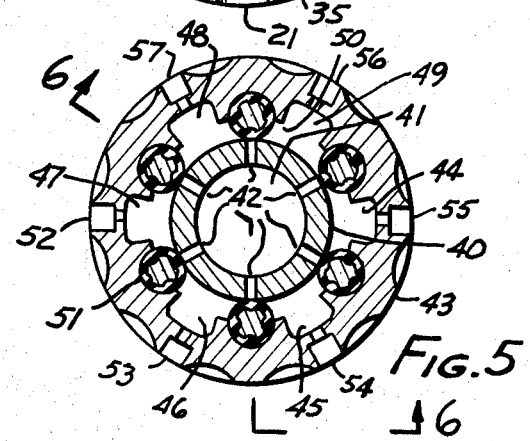
FIG. 5
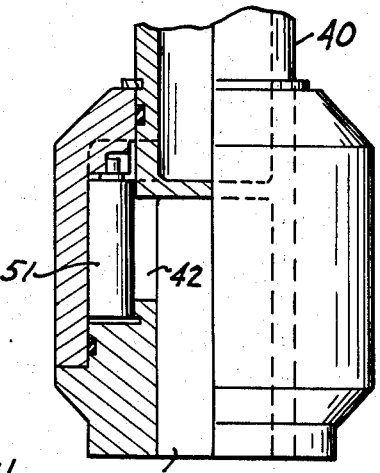
FIG. 6
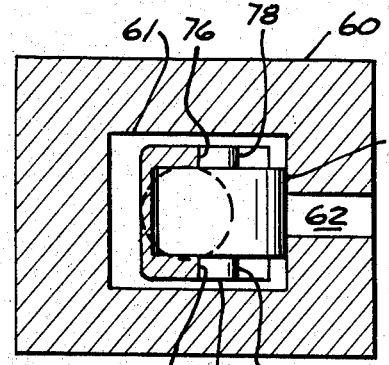
FIG. 4
FIG. 7
INVENTOR.
MARION J. BERGER
BY Angus & Mon
ATTORNEYS.

Patented Nov. 10, 1970
3,538,953
Sheet 2 of 2
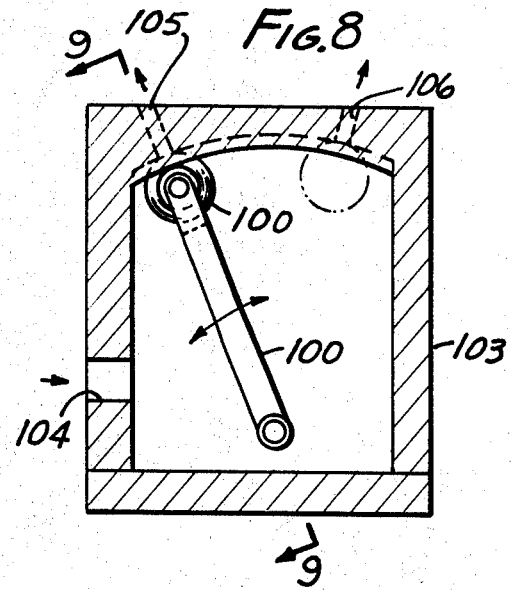
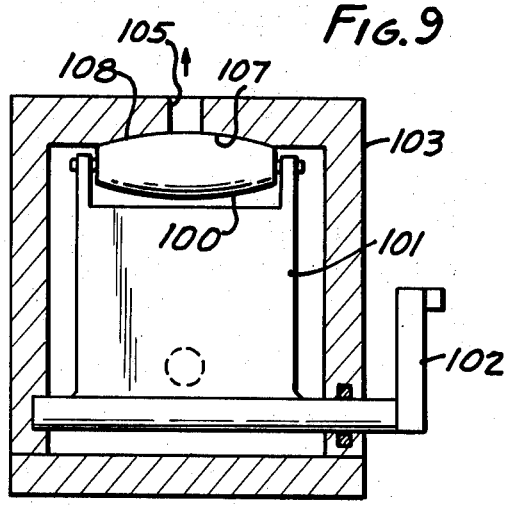
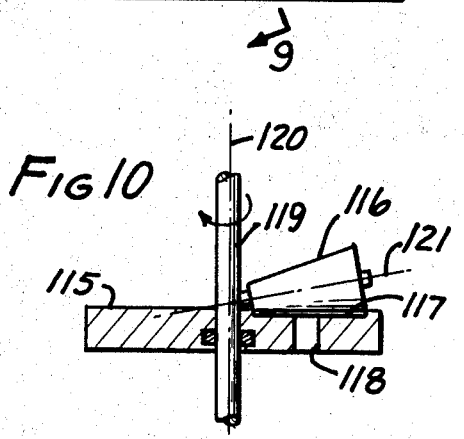
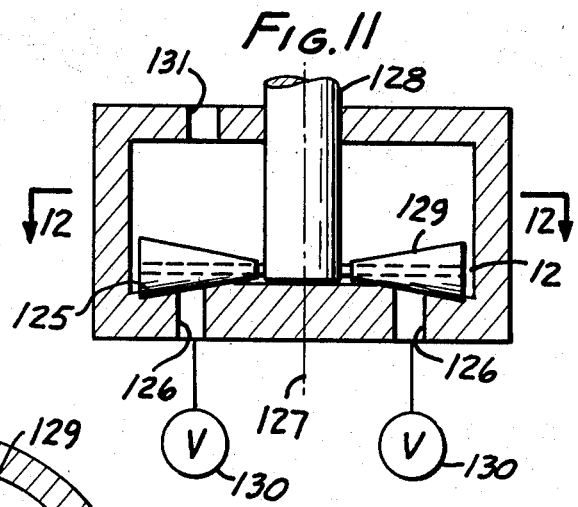
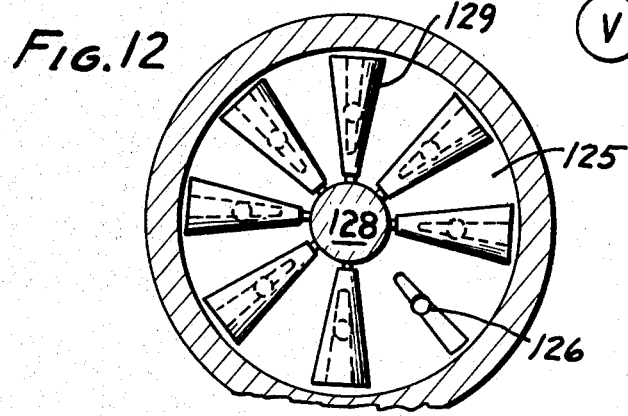
INVENTOR.
MARION J. BERGER
BY
ATTORNEYS.

3,538,953

ROLLER SEAL VALVE

This invention relates to a new and improved valve for the handling of fluids of liquid and gaseous form.

In the common multiported valves in use at present, sealing between the valve poppet and the valve body depends on closely controlled metal-to-metal sliding or compressive fits. Motion between the parts creates friction which tends to wear the parts and ultimately permit leakage. Impurities such as foreign matter in the fluid being valved can work in between moving parts and score the sealing surfaces, thus also permitting leakage. Where ordinary elastomeric seals in the form of O-rings are used, or resilient rubbing seals in general, high friction forces are generated which lead to increased operating forces for the valves.

An object of this invention is to provide a valve with seals between the poppet or equivalent rotor and the valve housing which will behave as rollers to decrease friction but yet provide a seal. A further optional object of the invention is to provide elastomeric coated rollers which will yield to surface imperfections to provide a seal without requiring the provision of extremely fine surface finish sealing surfaces. A further object of the invention is to provide elastomeric sealing rollers which will seal ports by deformation into the port without leakage.

A further object of the invention is to provide a valve with a multiplicity of rollers and a multiplicity of ports so that fluid channels in the housing may be selectively opened and closed. A further object of this invention is to provide a valve for the control of fluids in which the sealing is provided by elastomeric roller seals with no sliding friction required, and in which there is an ease and economy of manufacture resulting from the lack of a requirement for very close fits.

Further objects and advantages of this invention will become apparent from the disclosure hereof including the drawings.

The above and other features of this invention will be fully understood from the following detailed description and the accompanying drawings, in which:

FIG. 1 is a side elevation in partial cross section of the presently preferred embodiment of the invention;

FIG. 2 is a section taken on line 2-2 of FIG. 1;

FIG. 3 is a side elevation in partial axial cross section of another embodiment of the invention;

FIG. 4 is a cross section taken on line 4-4 of FIG. 3;

FIG. 5 is a top plan view of another embodiment of the invention in cross section;

FIG. 6 is a side elevation of the embodiment of FIG. 5 with a partial cross section taken on line 6-6;

FIG. 7 is a side view, partly in axial cross section showing a portion of the invention;

FIG. 8 is a cross section of another embodiment of the invention;

FIG. 9 is a cross section taken at line 9-9 of FIG. 8;

FIG. 10 is a schematic showing of a variation of the invention;

FIG. 11 is a side view, partly in cutaway cross section, showing still another embodiment of the invention; and FIG. 12 is a cross section taken at line 12-12 of FIG. 11.

FIG. 1 shows an embodiment of the invention in a rotary-type three-way valve where the housing 10 contains a rotor 11. Housing 10 has a bore 12 which is reduced at one end 13 to accept the operating shaft 14 of rotor 11. An O-ring seal 15 prevents leakage of fluid along the bore 13 and acts against shaft 14. The other end of bore 12 may be conveniently closed by a cap plug 16 which is removably attached to housing 10 by bolts 17 and sealed against leakage by an O-ring 18. Housing 10 has fluid ports 19, 20 and 21 which are transverse to the longitudinal axis of bore 12 and are adapted to permit the flow of fluids into and out of bore 12.

Rotor 11 is equipped with two cylindrical roller seals 22 and 23 which are installed in clevises 24 and 25 of rotor 11 with their axes parallel to the longitudinal axis of rotor 11 but displaced laterally from the axis of rotor 11, each roller seal being on opposite sides of the axis of rotor 11 and spaced 180° apart. The roller seals 22 and 23, of which a typical example can be seen in FIG. 7, are preferably made with a metallic shaft 26 which has reduced journal ends 27 and 28 for rotationally mounting in rotor 11. Slots 29 in rotor 11 permit the roller seals to be assembled into the rotor 11 onto a half-bearing surface 30 which permits rotation of the rotor seals 23 and 24. The roller seals are preferably covered with an elastomeric sheath 31 which can elastically deform for sealing. The rotor 11 is equipped with longitudinal passages 32 and 33 which permit flow of fluid in housing bore 12. Longitudinal bore 12 has recesses such as recesses 34 and 35 shown in FIG. 2 which are formed adjacent to each of the ports, such as 19 and 21 in FIG. 2 with said ports opening into the recesses 34 and 35, the recesses 34 and 35 being adapted to seat the roller seals 22 and 23 to provide indexing and detenting relationship of the roller seals to the ports.

In use, the embodiment of FIG. 1 would have port 21 connected to a fluid line in the position shown in FIG. 1, and ports 19 and 20 would be closed by roller seals 22 and 23. Turning rotor 11 sufficiently to disengage roller seals 22 and 23 from their sealing contact with ports 19 and 20 would permit fluid to flow along passages 32 and 33 from port 21 and thus out through ports 19 and 20. Of course the device of FIG. 1 could be equipped with other ports and additional roller seals to provide selective control of fluid flow from one or more sources to one or more points of use of the fluid. For instance, cap 16 could be provided with an inlet port so that a 180° rotation of rotor 11 will close off port 21, thus preventing the continuous flow from an inlet port on cap plug 16 through port 21 and thus divert the fluid flow through ports 19 and 20. These and other arrangements would be at the discretion of the designer using the valve principle enunciated here.

Another embodiment of the invention is shown in FIG. 5 and FIG. 6 where a rotor 40 has a central fluid passage 41 and a multiplicity of fluid ports 42. A valve housing 43 has a series of fluid passages 44, 45, 46, 47, 48 and 49 equally spaced around an internal bore 50. Roller seals such as exemplified by 51, and similar in construction to the roller seal shown and described in FIG. 7, are mounted in said housing 43 with bearing journals to permit rotation of the roller seals 51. Each of the fluid passages 44, 45, 46, 47, 48 and 49 may be provided with a fluid port such as ports 52, 53, 54, 55, 56, and 57. In this manner, rotation of the rotor 40 will permit the roller seals 51 to uncover ports 42, thus permitting fluid to flow out from the central fluid passage 41 into the housing fluid passages 44, 45, 46, 47, 48 and 49 permitting fluid flow out through ports 52, 53, 54, 55, 56 and 57 to points of use. Of course, the valve may be designed so that ports may be plugged at will to deliver flow to selected ports only.

FIGS. 3 and 4 present another embodiment of this invention which comprises a valve which is actuated by reciprocating motion of the valve actuator rather than by rotary motion as in the previously described embodiments.

The valve housing 60 is provided with an internal chamber 61. Housing 60 is provided with ports 62 and 63 which provide an inlet and outlet for fluid to be controlled through the valve. Valve housing 60 has a bore 64 which passes through valve body 60 into the chamber 61. An end plate member 65 is removably secured to the valve body by a series of bolts exemplified by bolt 66. A gasket 67 is provided to prevent leakage from the chamber 61 of the valve at the interface of the valve housing 60 and end plate 65. End plate 65 is provided with a bore 68 which is coaxial with the bore 64. A shaft 69 is provided with cylindrical ends 70 and 71 which are slidable in bores 64 and 68. O-ring seals 72 and 73 prevent leakage of fluid along the shaft ends through the bores. A central portion of shaft 69 is adapted to fit within the chamber 61 of the valve housing 60 and is of substantially rectangular cross section with a clevis portion designed to receive a roller seal 74 which has the substantial characteristics of the roller seal member described and illustrated in FIG. 7. Slotted bearing areas 75 and 76 accept the journal ends 77 and 78 of the roller seal 74. The axis of rotation of the roller seal 74 is disposed at substantially right angles to the longitudinal axis of the shaft 69, and the roller seal 74 protrudes from the clevis of shaft 69 to engage a planar wall 80 of the chamber 61, shaft 69 being so located in valve housing 60 with respect to chamber 61 that a compressive load is placed upon the periphery of roller seal 74 by planar wall 80 of the chamber 61.

In utilizing this valve for the control of a fluid, port 63 may be considered the inlet port. In the position shown, the roller seal 74 closes off port 62, preventing the flow of fluid. Sliding shaft 69 downwardly will open port 62 by rolling the roller seal 74 out of contact with the port 62. A phantom view of roller seal 74, which is indicated as 74a, illustrates the roller seal 74 in its translated position.

The embodiment of FIGS. 8 and 9 show a variation of the scheme of FIGS. 1 and 2. In this device, a roller seal 100 is mounted to a yoke 101 that is swung by a crank 102 between two positions, one shown in solid line and the other in phantom line.

Housing 103 has a inlet port 104 and a pair of outlet ports 105 and 106. The roller seal is adapted selectively to overlay each of them and seal the one it overlays. The device as shown is therefore a selector valve, although the porting clearly may be varied to suit other requirements.

The roller seal rolls along in a curved groove 107, and has a periphery 108 to match it. The roller seal is therefore self-centering. Its general construction is that which is shown in FIG. 7. This embodiment illustrates that the sealing surface need not be a right circular cylinder, but instead need only be a surface of revolution disposed so as to roll along an abutting surface, there being a port opening through the said surface.

In FIGS. 1—9, there has been a general parallelism between the axis of rotation of the sealing surface, and of the surface along which it rolls. FIGS. 10—12 illustrate that this does not constitute an essential limitation on the invention.

FIG. 10 shows a surface 115 along which a tapered roller 116 rolls. A declevity 117 is provided into which port 118 opens. The roller is constructed as in FIG. 7, except for the generated peripheral shape. It is rotatably mounted to rotary shaft 119. Axis 120 is the axis of rotation of shaft 119. Axis 121 is the axis of rotation of the roller. Axis 120 is normal to surface 115, but axis 121 is not; and it also is not perpendicular to axis 120. The roller is shaped like a tapered roller bearing or a tapered caster.

In FIG. 11 it is shown that the surface 125 into which ports 126 open, need not be a flat or cylindrical surface. It is frustoconical, with a central axis 127 coincident with the axis of rotation of shaft 128. Rollers 129 are mounted to shaft 129, whose axis of rotation is normal to axis 127.

As shown in FIG. 12, one fewer rollers 129 can be provided than ports 126, so that one will always be open. Secondary valves 130 can provide pressurized fluid to this selector valve so that fluid from the selected open port discharges from outlet port 131. Staggered or differential spacings may also be used for selection of ports to be opened.

This invention is thereby applicable to a wide range of surface and roller configurations, and to actuation techniques.

The rolling motion of the seals in all embodiments decreases friction, thus providing ease of actuation of the valve, and the general configuration using an elastomeric roller seal eliminates the necessity for fine finishes and close fits generally required in a reciprocating poppet valve of this type, providing for ease of manufacture and economies in use and manufacture.

The term "elastomeric" is used herein in its broadest context to describe a material that will deform under an applied load and return to its original form when the applied load is removed, in an elastic manner, and does not relate to any specific composition or class of composition.

I claim:

1. A valve construction which comprises: a housing, said housing having an internal fluid chamber in the form of a bore and a plurality of ports, said ports being adapted to pass fluid into and out of said fluid chamber; a cylindrical actuating member mounted for rotation in said bore, said bore having a plurality of fluid passages open to said bore and a series of exterior ports from the exterior of said housing opening into said fluid passages; a second fluid chamber within said actuating member, said second fluid chamber having at least one port opening outside of the valve assembly, a plurality of ports on said actuating member opening between said fluid chamber of said housing and said second fluid chamber of said actuating member; and a plurality of roller seal means mounted for rotation in said housing and adapted to coact between said housing and said actuating member by rolling motion, said roller seal means being in line contact with said cylindrical actuating member for selectively opening and closing at least some of said internal ports of said actuating member, whereby rotation of said actuating member, to move at least some of said internal ports from contact with said roller seal means, selectively controls the flow of fluid between said second chamber and said external ports through said internal ports and fluid passages.

2. A valve construction according to claim 1 in which the number of internal ports is equal to the number of fluid passages on said actuating member and the number of roller seal means is equal to the number of internal ports in said housing, said roller seal means selectively opening and closing all of said internal ports of said actuating member, whereby rotation of said actuating member will act to engage and disengage all of said roller seal means with all of said internal ports to selectively control the flow of fluid between said second fluid chamber and said external ports through said internal ports and said fluid passages.